United States Patent [19]

Kitano et al.

[11] Patent Number: 5,086,088

[45] Date of Patent: Feb. 4, 1992

[54] EPOXY-ACRYLATE BLEND PRESSURE-SENSITIVE THERMOSETTING ADHESIVES

[75] Inventors: Shuichi Kitano, Sagamihara; Kiyoshi Ogata, Hashimoto; Shinobu Sato, Tokyo, all of Japan

[73] Assignee: Minnesota Mining and Manufacturing Company, St. Paul, Minn.

[21] Appl. No.: 632,029

[22] Filed: Dec. 21, 1990

Related U.S. Application Data

[63] Continuation-in-part of Ser. No. 321,571, Mar. 9, 1989, abandoned.

[51] Int. Cl.$^5$ ................................................. C08F 2/46
[52] U.S. Cl. ..................... 522/170; 522/100; 522/103; 522/44
[58] Field of Search ............... 522/170, 100, 103, 44

[56] References Cited

U.S. PATENT DOCUMENTS

| | | | |
|---|---|---|---|
| 4,199,646 | 4/1980 | Hori et al. | 428/344 |
| 4,612,209 | 9/1986 | Forgó et al. | 427/54.1 |
| 4,771,085 | 9/1988 | Lazardis | 522/77 |
| 4,855,170 | 8/1989 | Darvell et al. | 428/40 |
| 4,943,461 | 7/1990 | Karim | 428/40 |
| 4,994,322 | 2/1991 | Delgado et al. | 428/343 |

*Primary Examiner*—Marion E. McCamish
*Assistant Examiner*—Mark A. Chapman
*Attorney, Agent, or Firm*—Gary L. Griswold; Walter N. Kirn; Gregory A. Evearitt

[57] ABSTRACT

The invention relates to a pressure-sensitive thermosetting adhesive comprising from about 30% to about 80% by weight of a photopolymerizable prepolymeric or monomeric syrup containing an acrylic ester and a polar copolymerizable monomer, from about 20% to about 60% by weight of an epoxy resin or a mixture of epoxy resins containing no photopolymerizable groups, from about 0.5% to about 10% by weight of a heat-activatable hardener for the epoxy resin, from about 0.01% to about 5% of a photoinitiator, and from 0% to about 5% of a photocrosslinking agent. In a preferred embodiment, imidazoles and thermally expandable thermoplastic microspheres are utilized in the inventive adhesive formulation.

20 Claims, No Drawings

EPOXY-ACRYLATE BLEND PRESSURE-SENSITIVE THERMOSETTING ADHESIVES

This application is a continuation-in-part application of U.S. application Ser. No. 7/321,571, filed Mar. 9, 1989, now abandoned.

FIELD OF THE INVENTION

This application relates to pressure-sensitive thermosetting adhesives comprising a blend of acrylic esters and epoxy resins.

DESCRIPTION OF THE RELATED ART

In the assembly of automotive components, e.g., automobile trim, a premade component may be bonded to the body by means of a high performance adhesive. Similarly, adjacent structural members may be sealed at their juncture by means of such an adhesive. Useful adhesives must be conformable to the bonding surfaces, must be initially tacky, and must adhere to such substrates as electron-deposited paint surfaces and oily metal.

Further, as the material may be applied to the structural member prior to heating in a paint curing oven, it must demonstrate high temperature resistance and high adhesiveness. Ideally the adhesive would be initially pressure-sensitive and would cure upon exposure to temperatures normally used in a paint curing oven, thereby permanently bonding the component to the structural member, or sealing a seam between adjacent structural members, yet remaining flexible.

High-performance adhesives are known for bonding of structural members and sealing of seams therebetween. One such adhesive is disclosed in U.S. Pat. No. 3,312,754, (Marks), which describes a liquid elastic adhesive for sealing the seams of metal containers. The mixture comprises 55 to 86 parts by weight of a glycidyl ether of a polyhydric compound, 14 to 45 parts by weight of butadiene-acrylonitrile-carboxyl terpolymer, wherein the carboxyl groups will react with a portion of the epoxy groups in the epoxy resin, and a "flexibilizing copolymer" for reacting with the unreacted epoxy groups. This copolymer is selected from butadiene-methacrylic acid, carboxylated copolymers of butadiene-styrene, and carboxylated copolymers of butadiene-acrylonitrile. This composition is said to have high adhesive to metal surfaces, to withstand temperatures of up to 180° C. without curing, and to cure at 375° C.

U.S. Pat. No. 4,447,579, (Tagaki et al.) discloses a room temperature curable epoxy resin adhesive with high adhesion to metals. Like Marks, the compositions consists of an epoxy resin and a synthetic rubber having terminal carboxyl groups. The mixture is crosslinked by a polyamine. These compositions are both liquid, and are therefore, difficult to handle, and must be applied to the structural member at the time of bonding.

U.S. Pat. No. 3,406,087, (Potter) discloses an expansion joint which consists of a synthetic rubber, typically polyisobutylene, polychloroprene or polyisoprene, which is partially vulcanized by the addition of sulfur. This is then coated with a bisphenol-A epoxy resin adhesive prior to bonding. This material is disclosed to require several months to cure at ambient temperatures.

A similar example of a rubber-based thermosetting composition is provided by U.S. Pat. No. 3,340,224 (Sherman). The composition is a blend of a comminuted synthetic rubber of the acrylonitrile type, and an epoxy resin, using N,N-diallylmelamine as a crosslinking agent. The product, used in a partially cured form, is a solid but is, unfortunately, substantially tack-free. When used in bonding or sealing applications, the material must be heated to temperatures in the range of 250° to 320° F. to effect wetting of the substrates to be joined or sealed and to form the cohesive bond.

U.S. Pat. No. 4,199,646 (Hori et al.) discloses a heat-activatable pressure-sensitive adhesive that may be conventionally coated on a backing material, or may be coated on a release liner having, e.g., a coating of silicone with a low degree of adhesivity. The latter tape, commonly called an adhesive transfer tape, is useful if the adhesive is to be interposed between two objects. This material comprises 100 parts of a copolymer of an acrylic ester of which the alkyl portion has between one and ten carbon atoms, and a polymerizable prepolymer having a functional group which may be a carboxyl, a hydroxyalkyl, a glycidyl or a methylol. This acrylic copolymer is then blended with preferably 70 to 150 parts of a hot melt resin, which may be an epoxy, phenolic or xylene, among others. If less than 50 parts of the hot melt resin are used, the shear strength is disclosed to be insufficiently high and the adhesive must be kept stationery under pressure. If, on the other hand, the quantity of hot melt exceeds 200 parts, the adhesive will not wet the adherend, rendering the peel strength will be too low. The material as described has "a low stickiness to the touch" and must be heated to at least 60° C. to adhere. Furthermore, since the material is solution coated onto a liner, thick films of the adhesive are not possible.

U.S. Pat. No. 4,503,200 (Corley) employs an epoxy resin, acrylated polyols such as trimethylolpropane triacrylate, a polycarboxyl curing agent, preferably trimellitic anhydride, and an "onium" curing accelerator, described as essential to increasing the heat deflection temperature. Because the uncured viscosity of the material is low, an applicator is required to apply the adhesive to a substrate, which must be clamped or held in place until the material is cured.

Acrylate pressure-sensitive adhesives are also well known in the art. In U.S. Pat. No. 24,906 (Ulrich), alkyl acrylate copolymers are described which are predominately alkyl esters of acrylic acid having from 4 to 14 carbon atoms, and further comprise a minor amount (3-12%, preferably 4-8%) of a polar copolymerizable monomer such as acrylic acid. Such adhesives are widely popular as they are readily available and provide a good balance of tack, shear and peel properties on a variety of substrates at a relatively low cost. These adhesives have been used for various automotive applications, e.g., attachment of decorative items to the painted surface.

U.S. Pat. No. 4,181,752 (Martens et al ) discloses a process for ultraviolet photopolymerization of alkyl acrylate esters and polar copolymerizable monomers to form the acrylate copolymer. Martens et al. teaches that intensity and spectral distribution of the irradiation must be controlled in order to attain desirable cohesive strengths and peel resistance. The photopolymerization is preferably carried out in an inert atmosphere as oxygen tends to inhibit the reaction. Adhesive properties for tapes made via the process disclosed by Martens et al. are improved over those made by solution polymerization in balance of adhesive properties.

Additional patents disclose the ultraviolet radiation of acrylate adhesives. U.S. Pat. No. 4,364,972 (Moon) discloses the use of N-vinylpyrrolidone as the polar copolymerizable monomer in the acrylate adhesive copolymer. High adhesion to automotive paints is disclosed, but not exemplified. U.S. Pat. Nos. 4,391,687, 4,329,384 and 4,330,590 (Vesley) disclose the use of specific chromophore-substituted-halomethyl-s-triazines as photoactive crosslinkers for acrylate copolymers.

Various polymers have been added as modifiers to acrylate adhesives. In U.S. Pat. No. 4,243,500 (Glennon), a pressure-sensitive adhesive is disclosed comprising at least one monofunctional unsaturated acrylate ester monomer, saturated tackifying resin polymers, non-crystallizing elastomeric material, and an initiator responsive to ultraviolet light or other penetrating radiation. Glennon specifies the use of UV light within a wavelength range of 1800–4000 Angstroms.

U.S. Pat. Nos. 4,552,604, 4,092,443 and 4,252,593 (Green) each disclose using a blend of an epoxy resin and acrylic ester. In the case of U.S. Pat. No. 4,552,604, it may be applied to a conventional or a strippable backing for use in bonding two surfaces. The resin blend is applied and then photopolymerized by exposure to actinic radiation to form a continuous adhesive film. The adhesive may then be transferred to the substrate and subsequently, thermoset. This adhesive likewise requires external pressure or clamping due to the poor internal strength of the uncured adhesive.

U.S. Pat. No. 4,612,209 (Forgo) describes an adhesive transfer tape for bonding a variety of substrates, including oily metal. The mixtures comprises a blend of 2 to 24% of an acrylic ester prepolymer, preferably a diol diacrylate and 20 to 90% of an epoxy resin. The blend is coated on a release liner and photopolymerized by exposure to actinic radiation to yield a pressure-sensitive adhesive that may be further heat cured. The composition as described may show high ultimate dynamic shear strength, but has poor initial adhesive and handling properties, i.e., it would also require external means of adhesion prior to epoxy cure.

Despite the interest in a pressure-sensitive structural adhesive that can be used for the bonding or seaming of metals, none has been yet seen commercially which yields the convenience of quick stick, and the high ultimate bond strength desirable.

SUMMARY OF THE INVENTION

The present invention provides an acrylic ester-/epoxy resin pressure-sensitive thermosetting adhesive, for use in structural bonding of components to metal surfaces or for the sealing of metal seams. Adhesives of the invention offer excellent adhesion to metal and painted surfaces, including oily metal surfaces, as well as high shear and peel strengths and excellent storage properties.

In one preferred embodiment of this invention, the inventive adhesive is constructed with the use of imidazoles as accelerators for the curing of the epoxy resin component of the adhesive.

In another preferred embodiment, the adhesive of the invention is a foam or foam-like adhesive which is developed through the use of heat-expandable thermoplastic microspheres.

The acrylic ester/epoxy resin pressure-sensitive thermosetting adhesive of the present invention is the photopolymerization reaction product of a blend comprising:

(a) from about 30% to about 80% by weight of a photopolymerizable prepolymeric or monomeric syrup containing an acrylic ester of a nontertiary alcohol, the alkyl groups of which have from about 4 to about 12 carbon atoms and a copolymerizable moderately polar monomer;

(b) from about 20% to about 60% by weight of an epoxy resin or a mixture of epoxy resins that contain at least two epoxy groups per molecule;

(c) from about 0.5% to about 10% by weight of a heat-activatable hardener for the epoxy resin, (d) from about 0.01% to about 5% of a photoinitiator; and (e) from 0% to about 5% of a photocrosslinking agent.

All ratios, parts, and percents herein are by weight unless specifically otherwise identified.

These terms have the following meanings as used herein.

1. The term "thermosetting" means the the adhesive may be cured to a final state of hardness by the use of heat.
2. The terms "cure", "cured", "uncured", and the like relate to the thermoset status of the epoxy resin and are not used to refer to the photopolymerization or the crosslinking of the acrylic polymer portion of the novel composition.

DETAILED DESCRIPTION OF THE INVENTION

The photopolymerizable prepolymeric or monomeric syrup contains an acrylic ester and a copolymerizable moderately polar comonomer. The acrylic ester is a monofunctional acrylic ester of a non-tertiary alcohol, having from about 4 to about 12 carbon atoms in the alcohol moiety. Included in this class of acrylic esters are butyl acrylate, hexyl acrylate, 2-ethylhexyl acrylate, octyl acrylate, isooctyl acrylate, decyl acrylate and dodecyl acrylate. The alkyl acrylate comprises from about 50 to about 95 parts of the prepolymer resin blend, and preferably from about 55 to about 80 parts.

The copolymerizable moderately polar monomers are preferably selected from the group consisting of nitrogen containing monomers such as N-vinyl pyrrolidone, N-vinyl caprolactam, N-vinyl piperidine and acrylonitrile. The moderately polar comonomer comprises from about 50 to about 5 parts of the prepolymer resin blend, and preferably from about 45 to about 20 parts.

The acrylic copolymers useful as pressure-sensitive adhesives are very stable compositions. Because of their unique stability, the novel pressure-sensitive thermosetting adhesives of the invention may be subjected to the heat conditions required for curing the epoxy resin without degradation of the pressure-sensitive adhesive portion of the composition. Other types of pressure-sensitive adhesives would begin to flow and experience a partial or total loss of adhesion, causing detachment of the structural parts prior to the conditions required, i.e., length and elevation of temperature, for thermosetting of the epoxy resin.

Further, both the photopolymerizable acrylic prepolymer or monomeric syrup and the photopolymerized polymer are compatible with the epoxy resin. Many monomeric mixtures would react with the epoxy resin to form a nonadhesive composition. The presence of the uncured epoxy resin would degrade many polymerized adhesive compositions even prior to heating.

Useful epoxy resins may be selected from the group of compounds that contain at least two epoxy groups per molecule. The epoxy resin must be either liquid or a semi-liquid at room temperature for handling purposes, although a mixture of a liquid and solid resin may be employed if the resulting mixture is liquid. Representative examples include phenolic epoxy resins, bisphenol epoxy resins, and halogenated bisphenol epoxy resins.

Preferred epoxy resins include bisphenol epoxies with the most preferred epoxy resin being the diglycidyl ether of a bisphenol-A, formed by reaction of bisphenol-A with epichlorohydrin.

The epoxy resin content should be 120 parts or less (when the acrylic ester content is 100 parts, hereinafter called "phr") and preferably from 25 to 40 phr. If more than 120 phr epoxy resin is used, adhesives show good ultimate shear strength, but the initial handling and adhesion properties are poor, e.g., quick stick and wet grab are low.

A hardener is added to effect the curing of the epoxy resin under application of heat. The hardener may be any type, but preferably an amine type hardener that is selected from the group comprising dicyandiamide or polyamine salts. These are available from a variety of sources, e.g., Omicure TM available from Omicron Chemical and Ajicure TM available from Ajinomoto Chemical.

Because there are many points in an automotive painting cycle at which the adhesive may be used, the heat to which the adhesive is exposed may be insufficient to fully cure the epoxy resin. In these cases, it may be advantageous to add an accelerator to the prepolymer blend, so the resin may fully cure at a lower temperature, or may fully cure when exposed to heat for shorter periods. Imidazoles are particularly preferred in the practice of the present invention for use as accelerators because of their ability, as shown by the examples herein, to extend the shelf life of acrylic based materials containing uncured epoxy resin. The most presently preferred imidazoles for use in the present invention are 2,4-diamino-6-(2'-methyl-imidazoyl)-ethyl-s-triazine isocyanurate; 2-phenyl-4-benzyl-5-hydoxymethylimidazole; and Ni-imidazole-phthalate.

In the present invention the prepolymeric or monomeric syrup of the resin blend, comprising items 1–5, supra, is initially photopolymerized to produce a thermosettable adhesive of coatable viscosity. The material used for this purpose may be of the photoinitiator or the photosensitizer type. The preferred photoinitiator is Irgacure TM 651 available from Ciba-Geigy Corporation, having the formula 2,2-dimethoxy-1,2-diphenylethane-1-one.

A photocrosslinking agent may also be added to the photopolymerizable mixture depending on the end result required. The use of such an agent will strongly crosslink the acrylic ester copolymer producing a very heat stable thermosetting adhesive which will not flow in a high temperature curing process, and will improve the initial strength (uncured strength) as well as the handling properties. When used as a sealant for metal seams, a flow of the adhesive in a high temperature curing process may be desired, so that the adhesive will flow into and completely seal a seam between two or more metal panels or E-D painted panels; in this instance, the use of a crosslinking agent may be omitted.

Thermal-type crosslinking agents are not suitable since the adhesives would continue to crosslink when exposed to heat, leading to bitterness of the adhesive.

The preferred crosslinking agents are multifunctional acrylates such as 1,6-hexanediol diacrylate as well as those taught in U.S. Pat. No. 4,379,201 (Heilmann et al.). Other types of crosslinking agents are also useful, e.g., any of the triazine crosslinking agents taught in U.S. Pat. Nos. 4,330,590 (Vesley), and 4,329,384 (Vesley et al.). When present, the crosslinking agent comprises less than 5 phr.

For best results in the bonding or seaming of metal, a thicker, foam-like pressure-sensitive transfer tape is preferred. The thickness should be more than 0.1 mm and is preferably more than 0.3 mm. Optionally, glass or polymeric hollow microbubbles are added to the photopolymerizable syrup prior to polymerization. The microspheres should have an average diameter of 10 to 200 micrometers, and comprise from about 5 to about 65 volume percent of the foam-like layer. The thickness of the foam-like layer in preferred tapes of the invention range from 0.3 mm to about 4.0 mm in thickness.

Preferred glass microspheres have average diameters of about 50 micrometers. When glass microspheres are used, the foam-like pressure-sensitive adhesive layer should be at least 3 times, and preferably at least 7 times, as thick as their diameter.

Useful glass microspheres include transparent microspheres such as those claimed in U.S. Pat. Nos. 3,315,615, (Beck et al.), and 3,391,646, (Howell), and colored microspheres such as those disclosed in U.S. Pat. Nos. 4,612,242, (Vesley et al.), 4,618,525, (Chamberlain et al ) and 4,666,771, (Vesley et al.).

Other useful materials which can be blended into the pressure-sensitive adhesive layer include, but are not limited to, fillers, pigments, fibers, woven and nonwoven fabrics, foaming agents, antioxidants, stabilizers, fire retardants, chain transfer agents, and viscosity adjusting agents.

Preferred foaming agents in the present invention are thermally expandable thermoplastic microspheres which contain a core material, such as a gas, which expands upon heating. Preferably, the core material is an organic substance which has a lower boiling point than the softening temperature of the thermoplastic resin.

Examples of preferred thermoplastic resins which may be used as the shells of the thermally expandable microspheres include, but are not limited to, acrylic acid group polymers such as ester polyacrylate; ester acrylate-acrylonitrile copolymer; ester methacrylate-acrylic acid copolymer; vinylidene chloride group polymers such as vinylidene chloride-ester methacrylate and vinylidene chloride-acrylonitrile copolymer.

Examples of materials which expand upon heating, include, but are not limited to, propane, butane, pentane, isobutane, or neopentane.

These thermally expandable microspheres are commercially available such as, for example, from Matsumoto Yushi Seyaku K.K. They are presently preferred because they do not decompose (by the exotherm generated from curing the acrylic monomers present in the inventive composition) before curing of the epoxy resins.

An especially useful filler material is hydrophobic silica as disclosed in U.S. Pat. Nos. 4,710,536 and 4,749,590, (Klingen et al.). In one preferred embodiment of the present invention, the removable pressure-sensitive adhesive layer further comprises from about 2 to about 15 phr of a hydrophobic silica having a surface area of at least 10 m²/g.

Another preferred additive is an encapsulated hardener, e.g., HX 938 available from Ciba Geigy Corporation. The use of such a hardener results in an improved storage ability for tapes of the invention.

The compositions of the present invention are preferably prepared by premixing together the photopolymerizable monomers and the photoinitiator. This premix is then partially polymerized to a viscosity in the range of from about 500 cps to about 5,000 cps to achieve a coatable syrup. Alternatively, the monomers may be mixed with a thixotropic agent such as fumed hydrophilic silica to achieve a coatable thickness. The crosslinking agent(s) and any other ingredients are added to the syrup prior to in situ crosslinking and polymerization.

This composition is coated onto a flexible carrier web, preferably a silicone release liner which is transparent to ultraviolet radiation, and polymerized in an inert, i.e., oxygen free, atmosphere, e.g., a nitrogen atmosphere. A sufficiently inert atmosphere can be achieved by covering a layer of the photoactive coating with a plastic film which is substantially transparent to ultraviolet radiation, and irradiating through that film in air as described in U.S. Pat. No. 4,181,752, (Martens et al.). If, instead of covering the polymerizable coating, the photopolymerization is to be carried out in an inert atmosphere, the permissible oxygen content of the inert atmosphere can be increased by mixing into the polymerizable monomer an oxidizable tin compound as taught in U.S. Pat. No. 4,303,485 (Levens) which also teaches that such procedures will allow thick coatings to be polymerized in air.

Where multilayer tape constructions are desirable, a preferred method of construction is described in U.S. Pat. No. 4,818,610, (Zimmerman et al.) wherein a plurality of copolymerizable coatable compositions is prepared, each composition containing at least one photopolymerizable monomer, one of the coatable composition being the novel pressure-sensitive adhesive of the invention being coated as a first or last layer. Migration of photopolymerizable monomers through the interface between contiguous layers is permitted and the superimposed layers are then simultaneously irradiated. This provides polymeric chains comprised of copolymers of photopolymerizable monomers originating from contiguous layers extending through the interface therebetween, thereby producing a tape having layers which cannot be delaminated.

The pressure-sensitive adhesive of the present invention should have a number of practical applications in industry. One utility of the inventive adhesive is in the automotive industry where it can be utilized in a process to fasten roof molding to a car body. (Roof molding, sometimes referred to in the automotive industry as "roof ditch molding", is the joint formed by the joining (welding) together of the outer roof sheet metal to the outer body side sheet metal of a vehicle.) By this process, one would first prepare the inventive tape which has combined acrylic foam and expandable melt properties. Subsequently, the tape would be applied to roof molding. The roof molding can then be fastened to the body of a car. Base coatings and top coatings could then be applied with subsequent curing of the coatings being effected through the use of a curing oven. Complete sealing and bonding of the roof molding part would be obtained because the inventive tape melts and then expands by the heat of the curing oven.

The pressure-sensitive foam-like tapes of the present invention were subjected to the following tests, both before and after thermosetting, in order to evaluate the performance as either a seam sealing or structural bonding adhesive.

TEST METHODS

Aluminum T-peel

A foam tape sample is placed between two strips of 13.5 mm×200 mm×0.125 mm anodized aluminum, leaving an adhesive free 25 mm tab at each end of each aluminum strip. The assembly is rolled down with a 6.8 Kg roller, one pass in each direction, and the samples then conditioned for 1 to 2 hours at room temperature. The tabs are bent back at 90° in opposite directions and respectively clamped in the upper and lower jaws of a tensile testing machine. The jaws are separated at a rate of 300 mm/minute, noting both the average force required to effect separation as well as the maximum force at adhesive failure.

E-D Paint Panel Dynamic Shear Strength

A 25 mm×25 mm sample of the adhesive was adhered between two E-D painted steel panels (25 mm×75 mm×0.8 mm), and rolled down with a 5 Kg roller. The two plates were connected to the jaws of an Instron apparatus and the jaws separated at 180° coplanar with the E-D paint panels, at a rate of 50 mm/minute. The force at adhesive failure was recorded.

Foam Strength and Foam Elongation

A dumbbell-cut sample (according to ASTM D-412) of the adhesive was connected to the jaws of an Instron and the jaws separated at a rate of 51 cm per minute. The force at foam break and the % elongation at break were recorded. This test was performed on both the cured and uncured tape samples as indicated.

Ethyl Acetate Solubility Test

It has been found in the present invention that the solubility behavior of the adhesive transfer tapes provides a useful indicator of the performance when used as a seam sealer. In this test a 0.2 gram sample and 15 ml of ethyl acetate were shaken together for three hours and the solubility or lack thereof was noted. Those compositions having good solubility were found to melt and flow well under the application of heat, and conversely those having marginal or poor solubility in ethyl acetate showed only moderate or poor flow.

Oily Metal

Two 75 mm×25 mm×0.8 mm flexible stainless steel panels were dipped into antirust oil, and then suspended for 24 hours to drain the excess oil. An end of one of the metal strips was coated with a 25 mm×25 mm sample of the adhesive, then covered with an end of the second metal strip, so that the two metal strips overlapped. The adhesive was secured to the metal strips by pressing with a 1.5 kg weight for 5 seconds. The free ends were secured to an Instron™, and the jaws separated at a rate of 12 in/min for the uncured samples, and at a rate of 0.5 in/min for the cured samples.

EXAMPLES

The following examples are for illustrative purposes only, and are not to be considered limiting in any way.

Glossary

Chemicals
DGEBA-diglycidyl ether of bisphenol-A
IRGACURE-Irgacure 651
HDDA-1,6-hexanediol diacrylate
DICY-Dicyandiamide
IOA-Isooctyl acrylate
NVP-N-vinyl pyrrolidone
AA-Acrylic Acid
BA-Butyl acrylate

Tests
ELONG-elongation
FS-Foam strength
ED-DS-electrodeposited dynamic shear

EXAMPLE 1

100 parts by weight of isooctyl acrylate/N-vinyl pyrrolidone (IOA/NVP), with a monomer ratio 71/29, was blended with 0.04 parts of IRGACURE TM, and photopolymerized with an ultraviolet (UV) light source under constant nitrogen purge to a viscosity of nearly 2000 cps. To the IOA/NVP prepolymer, and with continuous mixing, was added an additional 0.1 parts of IRGACURE TM, 50 parts of the diglycidyl ether of bisphenol-A (DGEBA), 5 parts of a dicyandiamide (DICY) hardener and 2.5 parts of MONURON TM, a p-chlorophenyl-dimethyl urea accelerator available from Aceto Chemical Company. After mixing for two hours with a laboratory mixer, the blend was degassed and then knife-coated on a transparent polyester liner, having a silicone release coating, to a thickness of 46 to 48 mils, then covered by a second transparent liner also having a silicone release coating. The coated mixture was photopolymerized using a UV light source. The intensity of the UV was 1.76 mw/cm$^2$ on the top side and 1.65 mw/cm$^2$ on the bottom side of the tape. The total UV energy was 450 mw/cm$^2$. The pressure sensitive transfer tape thus obtained was measured for T-peel, dynamic shear, foam strength and elongation as discussed above. The results are shown in Table 1-2 and 1-3.

EXAMPLES 2-4, AND 5C-8C

These examples were prepared as in Example 1. The proportion of the IOA relative to the NVP in the acrylate copolymer have been varied. Additionally, Example 2 contains Aerosil TM A-972 and Example 3 contains HDDA. The compositions are shown in Table 1-1 and the results of the tests shown in Tables 1-2 and 1-3.

TABLE 1-1

| | Examples | | | | | | | |
|---|---|---|---|---|---|---|---|---|
| | 1 | 2 | 3 | 4 | 5C | 6C | 7C | 8C |
| IOA | 71 | 60 | 60 | 60 | 40 | 20 | 100 | 20 |
| NVP | 29 | 40 | 40 | 40 | 60 | 80 | | 80 |
| IRGA-CURE | .14 | .14 | .14 | .14 | .14 | .14 | .08 | .08 |
| HDDA | | | .2 | | | | | |
| EPON 828 | 50 | 50 | 50 | 50 | 50 | 50 | 20 | 50 |
| DICY | 5 | 5 | 5 | 5 | 5 | 5 | 2 | 5 |
| MONURON | 2.5 | 2.5 | 2.5 | 2.5 | 2.5 | 2.5 | 1 | 2.5 |
| MATSUMOTO | | .8 | | | | | | |
| AEROSIL | | 2.0 | | | | | | |

All amounts are in parts by weight.

TABLE 1-2

| | Examples | | | | | |
|---|---|---|---|---|---|---|
| | 1 | 2 | 3 | 4 | 5C | 6C |
| Elongation | 772 | 1059 | 772 | 702 | 642 | 146 |
| FS* (uncured) | 119.6 | 485.1 | 472.4 | 686 | 3459.4 | 4655 |
| Elongation | 456 | 246 | 181 | 107 | 52 | 6 |
| FS* (140° C. × 20 minutes) | 5762 | 8364 | 5023 | 13034 | 11887.4 | 18522 |
| Elongation | 395 | 248 | 157 | 101 | 54 | 10 |
| FS* (140° C. × 40 minutes) | 4900 | 9236 | 5115 | 12740 | 13132 | 23912 |

*Foam strength at Kilopascals
**7C and 8C not tested, not handleable

TABLE 1-3

| | Examples | | | | | |
|---|---|---|---|---|---|---|
| | 1 | 2 | 3 | 4 | 5C | 6C |
| ED-DS* (uncured) | 411.6 | 754.6 | 818 | 715.4 | 2038.4 | 1244.6 |
| ED-DS* (140° C. × 20 minutes) | 2557.8 | 5841 | 2915 | 6831 | 6066 | 2685 |
| ED-DS* (140° C. × 40 minutes) | 1940 | 7095 | 2793 | 5860 | 6625 | 2911 |
| ED-DS* (at 70° C.) | 588 | 1529 | 1181 | 2372 | | |
| Oily Metal (uncured) | 93.1 | 51 | 68 | | | |
| Oily Metal (cured) (180° C. × 20 minutes) | 25676 | 29008 | 17836 | | | |

*E-D paint panel dynamic shear strength
**7C and 8C not tested, not handleable

EXAMPLES 9 TO 16

Examples 9-16 were prepared as indicated in Example 1, but the ratio of the acrylic copolymer to the epoxy was varied as indicated in Table 2-1. In Examples 9-12, dicyandiamide was used as a hardener, while in Examples 13C-16 fumaric acid was used. The results of the tests are shown in Table 2-2.

TABLE 2-1

| | Examples | | | | | | | |
|---|---|---|---|---|---|---|---|---|
| | 9 | 10 | 11 | 12 | 13C | 14 | 15 | 16 |
| IOA | 60 | 60 | 60 | 60 | 71 | 71 | 71 | 71 |
| NVP | 40 | 40 | 40 | 40 | 29 | 29 | 29 | 29 |
| IRGACURE | .14 | .14 | .14 | .14 | .1 | .1 | .1 | .1 |
| EPON 828 | 120 | 80 | 20 | 120 | 170 | 85 | 85 | 42.5 |

TABLE 2-1-continued

|  | Examples | | | | | | | |
|---|---|---|---|---|---|---|---|---|
|  | 9 | 10 | 11 | 12 | 13C | 14 | 15 | 16 |
| OMICURE CG 1200 | 12 | 8 | 2 | 12 | | | | |
| MONURON | 6 | 4 | 1 | 6 | 2 | 1 | 1 | 0.5 |
| FUMARIC | | | | | 50 | 25 | 25 | 12.5 |
| AEROSIL | | | 10 | 4.6 | 3.1 | 3.1 | | 2.4 |
| MATSUMOTO 5-80-ED | | | | | | 1.48 | | 1.15 |

TABLE 2-2

|  | Examples | | | | | | | |
|---|---|---|---|---|---|---|---|---|
|  | 9 | 10 | 11 | 12 | 13C | 14 | 15 | 16 |
| Elongation | | 1100 | 975 | 1100 | | 1000 | 1000 | 659 |
| FS* (uncured) | | 270 | 779 | 352 | | 622 | 1543 | 1068 |
| Elongation | | 48 | 386 | 6 | | | | |
| FS* (140° C. × 40 minutes) | | 13083 | 3871 | 24451 | | | | |
| ED-DS** (uncured) | | 176 | 828 | 363 | | 63 | 35 | 464 |
| ED-DS** (140° C. × 40 minutes) | | 9114 | 2646 | 13965 | | | | |
| Aluminum T-Peel (Average) | | | | | | 237 | 336 | 315 |
| ED-DS** (120° C. × 40 minutes) | | | | | | 1529 | 1770 | 951 |
| ED-DS** (140° C. × 20 minutes) | | | | | | 1793 | 868 | 1284 |

*Foam strength at Kilopascals
**E-D paint panel dynamic shear strength

EXAMPLES 17-19, 20C AND 21C

These samples were prepared as in Example 1, substituting other acrylates for the IOA or other moderately polar comonomers for the NVP. The compositions are shown in Table 3-1 and the results of the test are shown in Table 3-2.

TABLE 3-1

|  | Examples | | | | |
|---|---|---|---|---|---|
|  | 17 | 18 | 19 | 20C | 21C |
| Butylacrylate | 80 | | 65 | | |
| IOA | | | | 87.5 | |
| Isononylacrylate | | 60 | | | |
| t-butylacrylate | | | | | 80 |
| NVP | 20 | 40 | | | 20 |
| AA | | | | 12.5 | |
| Hydroxyethylacrylate | | | 35 | | |
| HDDA | | | | | |
| IRGACURE | .14 | .14 | .14 | .14 | .14 |
| EPON 828 | 50 | 50 | 50 | 40 | 40 |
| OMICURE CT 1200 | 5 | 5 | 5 | 3 | 4 |
| MONURON | 2.5 | 2.5 | 2.5 | 1.5 | 2 |

TABLE 3-2

|  | Examples | | | | |
|---|---|---|---|---|---|
|  | 17 | 18 | 19 | 20C | 21C |
| Elongation % | 772 | 772 | 166 | *** | 54 |
| FS* (uncured) | 41 | 381 | 365 | *** | 13720 |
| Elongation % | 495 | 234 | 13.5 | *** | **** |
| FS* (140° C. × 20 minutes) | 1999 | 8800 | 14308 | *** | **** |
| Elongation % | 472 | 265 | 9.5 | *** | **** |
| FS* (140° C. × 40 minutes) | 2470 | 9104 | 12936 | *** | **** |
| ED-DS** (uncured) | | 69 | 647 | 274 | *** | **** |
| ED-DS** (140° C. × 20 minutes) | 4185 | 6390 | 4155 | *** | **** |
| ED-DS** (140° C. × 40 minutes) | 4243 | 7379 | 3881 | *** | **** |

*Foam Strength at kPa
**E-D paint panel dynamic shear strength
***No compatibility
****Foam too hard, not testable

EXAMPLES 22-30

These examples were prepared as in Example 1, holding the composition of the acrylate copolymer and the epoxy content constant, but varying the accelerator used. The compositions are shown in Table 4-1, and the results of the tests shown in Table 4-2 and 4-3.

TABLE 4-1

|  | Examples | | | | | | | | |
|---|---|---|---|---|---|---|---|---|---|
|  | 22 | 23 | 24 | 25 | 26 | 27 | 28 | 29 | 30 |
| IOA | 71 | 71 | 71 | 71 | 71 | 71 | 71 | 71 | 71 |
| NVP | 29 | 29 | 29 | 29 | 29 | 29 | 29 | 29 | 29 |
| IRGACURE | .14 | .14 | .14 | .14 | .14 | .14 | .14 | .14 | .14 |
| EPON 828 | 40 | 40 | 40 | 40 | 40 | 40 | 40 | 40 | 40 |
| OMICURE CG-1200 | 4 | 4 | 4 | 4 | 4 | 4 | 4 | 4 | 4 |
| MONURON | 2 | 2 | | | 2 | | | | |
| AJICURE MY-24 | | | 2 | | | 2 | | | |
| AJICURE PN-23 | | | | 2 | | | 2 | | |
| OMICURE #52 | | | | | 2 | | | | 2 |
| GLASS BUBBLES C15/250 | | | | | | 8 | 8 | 8 | 8 |
| DEGUSSA fumed silica | | | | | | 4 | 4 | 4 | 4 |

TABLE 4-2

| | Example | | | | | | | | |
|---|---|---|---|---|---|---|---|---|---|
| | 22 | 23 | 24 | 25 | 26 | 27 | 28 | 29 | 30 |
| Aluminum T-Peel* Average | 227.5 | 260.8 | 399 | 308 | 283.5 | 371 | 397 | 400.8 | 383 |
| Aluminum T-Peel* Maximum | 304.5 | 430.5 | 511 | 472.5 | 381.5 | 420 | 476 | 432.2 | 476 |
| Aluminum T-Peel* Average (140° C. × 20 minutes) | 521.5 | 353 | 623 | 661 | 465 | 498 | 605 | 574 | 462 |
| Aluminum T-Peel* Maximum (140° C. × 20 minutes) | 626.5 | 463 | 700 | 731.5 | 591.5 | 577 | 639 | 630 | 509 |
| Aluminum T-Peel* Average (180° C. × 20 minutes) | 255.5 | 297 | 416.5 | 427 | 311.5 | 85.9 | 166.3 | 126.4 | 106 |
| Aluminum T-Peel* Maximum (180° C. × 20 minutes) | 388 | 409 | 511 | 479.5 | 385 | 118.6 | 212.8 | 168.3 | 175.9 |
| ED-DS** Initial | 278 | 283 | 405 | 371.7 | 265 | 361 | 393.8 | 421.7 | 321.8 |
| ED-DS** (140° C. × 20 minutes) | 1210 | 1869 | 1282 | 2031 | 1893 | 1793 | 1250 | 1405 | 1684 |
| ED-DS** (180° C. × 20 minutes) | 1567 | 1744 | 2017 | 2684 | 2191 | 1629 | 1929 | 1746 | 1777 |

*Measured at N/DM
**Measured at Kilo Pascals

TABLE 4-3

| | Example | | | | | | | | |
|---|---|---|---|---|---|---|---|---|---|
| | 22 | 23 | 24 | 25 | 26 | 27 | 28 | 29 | 30 |
| Foam Strength* Initial | 1384 | 1485 | 1394 | 1324 | 1084 | 1868 | 2007 | 1998 | 1760 |
| % Elongation* Initial | 1171 | 1178 | 1157 | 1153 | 1149 | 1170 | 1170 | 1170 | 1170 |
| Foam Strength* (140° C. × 20 minutes) | 6076 | 13454 | 7218 | 9551 | 6417 | 7792 | 4348 | 6213 | 8356 |
| % Elongation* (140° C. × 20 minutes) | 498 | 512 | 872 | 684 | 533 | 301 | 603 | 400 | 326 |
| Foam Strength* (180° C. × 20 minutes) | 8466 | 11906 | 9711 | 9651 | 10076 | 8523 | 6878 | 7499 | 8698 |
| % Elongation* (180° C. × 20 minutes) | 394 | 395 | 490 | 439 | 408 | 274 | 267 | 229 | 270 |
| Foam strength* (40° C. × 1 month) | 1522 | 1771 | 1937 | 4112 | 1633 | | | | |
| % Elongation* (40° C. × 1 month) | 1171 | 1170 | 1160 | 953 | 1065 | | | | |
| Foam Strength* (humid × 1 month) | 1134 | 1225 | 2098 | 2037 | 1377 | | | | |
| % Elongation* (humid × 1 month) | 1153 | 1182 | 1176 | 1179 | 1174 | | | | |

*Measured in Kilopascals

EXAMPLES 31 TO 40

These samples were again prepared as in Example 1 and the melting behavior and solubility as a function of the composition was determined. The compositions and results of the tests are shown in Table 5-1.

ADDITIONAL TEST METHODS

Solubility

This test is a measure of the solubility of the accelerator in a mixture of 80/20 butyl acrylate (BA)/N-vinyl pyrrolidone (NVP). 6 grams of accelerator were placed in 100 grams of an 80/20 BA/NVP monomer mixture and mixed on a roller mill for 24 hours. The liquid was filtered through a No. 5A filter paper (available from

TABLE 5-1

| | Examples | | | | | | | | | |
|---|---|---|---|---|---|---|---|---|---|---|
| | 31 | 32 | 33 | 34 | 35 | 36 | 37 | 38 | 39 | 40 |
| IOA | 71 | 71 | 80 | | | | | | | |
| 2-ethyl hexylacrylate | | | | 71 | 80 | | | | | |
| Butyl acrylate | | | | | | 60 | 71 | 80 | 80 | |
| Isononyl acrylate | | | | | | | | | | 71 |
| NVP | 29 | 29 | 20 | 29 | 20 | 40 | 29 | 20 | 20 | 29 |
| EPOXY | 60 | 60 | 60 | 60 | 60 | 60 | 60 | 60 | 60 | 60 |
| DICY | 6 | 6 | 6 | 6 | 6 | 6 | 6 | 6 | 6 | 6 |
| MONURON | 3 | 3 | 3 | 3 | 3 | 3 | 3 | 3 | 3 | 3 |
| IRGACURE | 1.04 | 0.14 | 1.04 | 1.04 | 1.04 | 0.14 | 1.04 | 0.14 | 1.04 | 1.04 |
| Melting at 140° C. Cure | poor | poor | good | poor | good | poor | fair | fair | good | poor |
| Solubility | insoluble | insoluble | soluble | insoluble | soluble | insoluble | soluble | soluble | soluble | insoluble |

Toyo Roshi Kaisha, LTD). 5 ml of the filtrate was heated in a pan in a 100° C. oven to evaporate the monomer and the amount of accelerator left in the pan was measured.

% Conversion

This test is a measure of the degree of cure of a thermosetting resin and thereby a measure of the shelf life of the resin. The test is performed by measuring the initial and heat-aged exotherms of the resin on a differential scanning calorimeter (DSC) at a ramp speed of 10 C/min. The DSC used was a Perkin-Elmer DSC-2C. Samples are heat then aged at 50° C. for one week and tested. The percent conversion is calculated by taking the difference of the initial and heat-aged exotherms and dividing by the initial exotherm.

Dynamic Shear Strength

This test is a measure of the strength of the epoxy resin. The test is conducted with samples at 140° C. for 20 minutes and at 40 minutes. A shear strength at 40 minutes should be within 10% of the shear strength at 20 minutes. A 12 mm×25 mm sample of the tape was adhered between 0.8 mm thick panels of SPCC-SD cold rolled carbon steel (SPCC-SD is defined by Japanese Industrial Standard G-3141.) and rolled down with a 5 kg roller. After heat aging, the non-adhesive coated portions of the plates were placed in Instron jaws and the jaws were separated at 180 degrees coplanar with the steel panels at a rate of 50 mm/minute. The force at adhesive failure was recorded.

EXAMPLE 41

100 parts by weight of a mixture of butylacrylate/N-vinylpyrrolidone (BA/NVP), with a monomer ratio of 80/20, was blended with 0.04 parts of IRGACURE TM 651 photoinitiator (available from Ciba-Geigy Corp.), and photopolymerized with an ultraviolet (UV) light source under a constant nitrogen purge to a viscosity of about 3000 cps. To the partially polymerized mixture was added an additional 0.1 parts of IRGACURE TM 651, 50 parts of Epon 1001 (available from Shell Chemical Co.), 30 parts Epon 828 (available from Shell Chemical Co.) 6.0 parts of micronized dicyandiamide (DICY) hardener, 2.0 parts of 2,4-diamino-6-[2'-methylimidazoyl-(1)']-ethyl-S-triazine isocyanurate adduct (2MA-OK; available from Shikoku Chemical Co., Ltd) as the accelerator, 6 parts glass bubbles having an average diameter of about 60 microns (C-15/250 available from Minnesota Mining & Manufacturing Co.), 4 parts of fumed silica (R972 available from DeGussa), and 0.05 parts of 3-mercaptopropionic acid as a chain transfer agent. The mixture was mixed with a laboratory mixer for about two hours, degassed, then knife coated onto a transparent silicone coated polyester liner having a thickness of about 1.0 mm., and then covered with a second similar polyester liner. The coated mixture was photopolymerized using UV light sources above and below the tape having intensities of 0.5 mW/cm$^2$ to 1.0 mW/cm$^2$. The total UV energy was 450 mJ/cm$^2$. The resulting pressure-sensitive adhesive transfer tape was measured for conversion after heat aging and dynamic shear at 140° C. for 20 minutes and 40 minutes. The results in Table 6 below show that the adhesive does not cross-link significantly with time but the accelerator does not inhibit cure since after 20 minutes or curing, the adhesive has the same dynamic shear as compared to the sample cured for 40 minutes. The epoxy was fully cured.

EXAMPLE 42

An adhesive transfer tape was prepared as in Example 41 except that the accelerator used was 2.0 parts of 2-phenyl-4-benzyl-5-hydroxymethylimidazole (2P4BHZ—available from Shikoku Chemical Co., Ltd.). The tape was tested as in Example 4 and results are shown in Table 6.

EXAMPLE 43

An adhesive transfer tape was prepared as in Example 41 except that the accelerator was 2.0 parts of Ni-Imidazole-phthalate (as disclosed in U.S. Pat. No. 4,772,645). The tape was tested as in Example 41 and results are shown in Table 6.

EXAMPLE 44

An adhesive transfer tape was made as in Example 41 except that the accelerator used was 2.0 parts of 2-phenyl-4-ethyl-5-hydroxymethylimidazole (2P4MHZ—available from Shikoku Chemical Corp.). The tape was tested as in Example 41 and results are shown in Table 6.

EXAMPLE 45-C

An adhesive transfer tape was made as Example 41 except that the accelerator used was 2.0 parts of p-chlorophenyldimethyl urea (MONURON TM available from Aceto Chemical Company). The transfer tape was tested as in Example 41 and results are shown in Table 6.

EXAMPLE 46-C

An adhesive transfer tape was made as in Example 45-C except that 1.0 parts of MONURON TM accelerator was used. Test results are shown in Table 6.

EXAMPLE 47-C

An adhesive transfer tape was made as in Example 41 except that the accelerator used was 2.0 parts of 3-phenyl-1,1-dimethylurea (Omicure-94 available from Aceto Chemical Company). Test results are shown in Table 6.

EXAMPLE 48-C

An adhesive transfer tape was made as in Example 41 except that the accelerator used was 2.0 parts of 1,1-4(methyl-m-phenylene)-bis-3,3-dimethyl urea (Omicure 24 available from Aceto Chemical Company). Test results are shown in Table 6.

TABLE 6

| Example | Solubility g/100 ml | % Conversion | Dynamic Shear-Kg/cm$^2$ 20 min | 40 min |
|---|---|---|---|---|
| 41 | 0.16 | 0.1 | 62 | 60 |
| 42 | 0.02 | 1.5 | 65 | 61 |
| 43 | 0.00 | 0.1 | 60 | 64 |
| 44 | 0.02 | 10.3 | 50 | 70 |
| 45-C | 3.2 | 22.0 | 60 | 64 |
| 46-C | 3.2 | 18.2 | 36 | 70 |
| 47-C | 4.92 | 30.5 | 63 | 63 |
| 48-C | 1.02 | 23.8 | 62 | 63 |

EXAMPLE 49

100 parts by weight of a mixture of butylacrylate/N-vinylpyrrolidone (BA/NVP), with a monomer ratio of 80/20, was blended with 0.04 parts of IRGACURE TM 651, and photopolymerized with an ultraviolet (UV) light source under a constant nitrogen purge to a viscosity of about 3000 cps. To the partially polymerized mixture was added an additional 0.1 parts of IRGACURE ™ 651, 50 parts of Epon 1001 (available from Shell Chemical Co.), 30 parts Epon 828 (available from Shell Chemical Co.) 10 parts of micronized dicyandiamide (DICY) hardener, 3 parts of 2,4-diamino-6'-[2'-methylimidazoyl-(1)']-ethyl-S-triazine isocyanurate (2MA-OK; available from Shikoku Chemical Co., Ltd) as the accelerator, 6 parts glass bubbles having an average diameter of about 60 microns (C-15/250), 4 parts of fumed silica (R972), 0.05 parts of 3-mercaptopropionic acid as a chain transfer agent, and 6 parts of an expandable microsphere (F-50D available from Matsumoto Yushi-Seiyaku Co. Ltd.). The mixture was mixed with a laboratory mixer for about two hours, degassed, then knife coated onto a transparent silicone coated polyester liner having a thickness of about 1.0 mm., and then covered with a second similar polyester liner. The coated mixture was photopolymerized using UV light sources (positioned above and below the tape) having intensities of 0.5 mW/cm$^2$ to 1.0 mW/cm$^2$. The total UV energy was 450 mJ/cm$^2$. The resulting pressure-sensitive adhesive transfer tape was 5 measured for expansion by cutting the tape to a 50 mm × 50 mm size, measuring the thickness, and applying to a stainless steel panel. The sample was cured at 140° C. for 30 minutes. After the sample was cooled to room temperature, the thickness of the sample was measured and the expansion ratio was calculated to be the difference in thickness before and after curing divided by the thickness before curing and multiplying by 100 to get a percent. The expansion ratio for this sample was 130%.

EXAMPLES 50-52

Adhesive transfer tapes were made and tested as in Example 49 except that the hardener accelerator used was of p-chlorophenyl-1,1-dimethylaminourea (Monuron). The expansion ratios are shown in Table 7.

EXAMPLES 53-54

Adhesive transfer tapes were made and tested as in Example 50 except that the amount of hardener was varied as shown in Table 7.

EXAMPLES 55-57

Adhesive transfer tapes were made and tested as in Example 49 except that the amount of foaming agent was varied as is shown in Table 7.

TABLE 7

| Example | BA/NVP 100 pts | Epon 1001 | Epon 828 | DICY | Monuron | Foam Agent | Expan. Ratio % |
|---|---|---|---|---|---|---|---|
| 50 | 80/20 | 50 | 30 | 10 | 3 | 6 | 120 |
| 51 | 80/20 | 120 | 80 | 28 | 7 | 10 | 127 |
| 52 | 80/20 | 12 | 8 | 2.8 | 0.7 | 3.8 | 116 |
| 53 | 80/20 | 56 | 34 | 3.2 | 0.8 | 6 | 120 |
| 54 | 80/20 | 4 | 26 | 20 | 6 | 6 | 121 |
| 55 | 80/20 | 50 | 30 | 10 | 3 | 1.9 | 35 |
| 56 | 80/20 | 50 | 30 | 10 | 3 | 21 | 420 |
| 57 | 80/20 | 50 | 30 | 10 | 3 | 30 | 710 |

EXAMPLE 58

An adhesive transfer tape was made and tested as in Example 49 except that the adhesive contained epoxy 27 parts of Epon 1004 (available from Shell Chemical Co.) and 53 parts of Epon 828. The tape was tested and had an expansion ratio of 126%.

EXAMPLE 59

An adhesive transfer tape was made and tested as in Example 49 except that the acrylate used was 75 parts of IOA and 25 parts of N-vinylpyrrolidone. The tape had an expansion ratio of 121%.

EXAMPLE 60

An adhesive transfer tape was made as in Example except that the foaming agent used was 6 parts of p-toluenesulphonylhydrazide. The tape had an expansion ratio of 660%.

EXAMPLE 61-C

An adhesive transfer tape was made as in Example 49 except that the hardener was 16 parts of DICY and 4 parts of Monuron. The foaming agent used was 0.4 parts of F-50D The tape had an expansion ratio of about 10%.

EXAMPLE 62-C

An adhesive transfer tape was made as in Example 49 except with 265 parts of Epon 1001, 176 parts of Epon 828, 23 parts DICY, 6 parts of Monuron, and 18 parts of F-50D foaming agent. The resulting tape did not have enough acrylate to form a cohesive tape that could be removed from the liner.

EXAMPLE 63-C

An adhesive transfer tape was made as in Example 49 except with 5.6 parts of Epon 1001, 3.8 parts of Epon 828, 3.6 parts of DICY, 0.9 parts of Monuron, and 3.5 parts of F-50D. The resulting tape did not thermoset because of the low level of epoxy. The tape had an expansion ratio of 125%.

EXAMPLE 64-C

An adhesive transfer tape was made as in Example 49 except with 43 parts of Epon 1001, 28 parts of Epon 828, 36 parts of DICY, 9 parts of Monuron, and 3 parts of F-50D foaming agent. The resulting tape had very poor shelf life due to the large amount of hardener. The tape had an expansion ratio of 110%.

EXAMPLE 65-C

An adhesive transfer tape was made as in Example 49 except with 39 parts of Epon 1001, 26 parts of Epon 828, 10 parts of DICY, 3 parts of Monuron, and 146 parts of F-50-D foaming agent. The resulting tape had too much foaming agent and a cohesive tape could not be removed from the liner.

Reasonable modifications and variations are possible from the foregoing disclosure without departing from either the spirit or scope of the present invention as defined in the claims.

What is claimed is:

1. A pressure-sensitive thermosetting adhesive which is the photopolymerization reaction product of a blend consisting essentially of:
   (a) from about 30% to about 80% by weight of a photopolymerizable monomeric or prepolymeric syrup containing an acrylic acid ester of a nontertiary alcohol, and a moderately polar copolymerizable monomer; (b) from about 20% to about 60% by weight of an epoxy resin or a mixture of epoxy resins containing no photopolymerizable groups; (c) from about 0.5% to about 10% by weight of a heat-activatable hardener for the epoxy resin; (d) from about 0.01% to about 5% of a photoinitiator; and (e) from 0% to about 5% of a photocrosslinking agent.

2. The pressure-sensitive thermosetting adhesive of claim 1 wherein said epoxy resin is selected from the group consisting of phenolic epoxy resins, bisphenol epoxy resins, and halogenated bisphenol epoxy resins.

3. The pressure-sensitive thermosetting adhesive of claim 1 wherein said epoxy resin is the diglycidyl ether of bisphenol A.

4. The pressure-sensitive thermosetting adhesive of claim 1 wherein said epoxy resin comprises from about 25% to about 40% of the adhesive.

5. The pressure-sensitive thermosetting adhesive of claim 1 wherein said monomeric or prepolymeric syrup comprises:
   (a) from about 50 to about 95 parts of an alkyl acrylate ester monomer, the alkyl groups of which have an average of 4 to 12 carbon atoms; and
   (b) correspondingly, from about 50 parts to about 5 parts of a nitrogen-containing moderately polar copolymerizable monomer.

6. The pressure-sensitive thermosetting adhesive of claim 1 wherein said monomeric or prepolymeric syrup comprises:
   a) from about 50 parts to about 95 parts of an alkyl acrylate ester selected from the group consisting of isooctyl acrylate, isononyl acrylate, decyl acrylate, dodecyl acrylate, butyl acrylate, ethyl-hexyl acrylate and hexyl acrylate,
   b) correspondingly from about 50 parts to about 5 parts of a monoethylenically unsaturated polar copolymerizable monomer selected from the group consisting of acrylic acid, N-vinylpyrrolidone, hydroxyethylacrylate and mixtures thereof.

7. The pressure-sensitive adhesive of claim 6 wherein said monomeric or prepolymeric syrup comprises:
   a) from about 85 parts to about 95 parts isooctyl acrylate; and
   b) correspondingly, from about 5 parts to about 15 parts acrylic acid.

8. The pressure-sensitive adhesive of claim 6 wherein said monomeric or prepolymeric syrup comprises:
   a) from about 60 parts to about 80 parts isooctyl acrylate; and
   b) correspondingly, from about 40 parts to about 20 parts N-vinyl pyrrolidone.

9. The pressure-sensitive adhesive of claim 6 wherein said acrylic monomeric or prepolymeric syrup comprises:
   a) from about 60 parts to about 85 parts butylacrylate; and
   b) correspondingly, from about 40 parts to about 15 parts N-vinylpyrrolidone.

10. The pressure-sensitive adhesive of claim 1 wherein said blend further contains an imidazole curing accelerator for said epoxy resin.

11. The pressure-sensitive adhesive of claim 10 wherein said imidazole is one selected from the group consisting of: 2,4-diamino-6-(2-methylimidazoyl)-ethyl-s-triazine isocyanurate; 2-phenyl-4-benzyl-5-hydroxymethylimidazole; and N-imidazole-phthalate.

12. The pressure-sensitive adhesive of claim 11 wherein said imidazole is 2,4-diamino-6-(2-methylimidazoyl)-ethyl-s-triazine isocyanurate.

13. The pressure-sensitive adhesive of claim 11 wherein said imidazole is 2-phenyl-4-benzyl-5-hydroxymethylimidazole.

14. The pressure-sensitive adhesive of claim 11 wherein said imidazole is N-imidazole-phthalate.

15. The pressure-sensitive adhesive of claim 11 further containing a heat expandable thermoplastic microsphere which contains a core material which expands upon heating.

16. The pressure-sensitive adhesive according to claim 15 wherein said core material is an organic substance which has a lower boiling point than the softening temperature of said thermoplastic resin.

17. An article comprising roof molding with a layer of the pressure-sensitive adhesive of claim 15.

18. The pressure-sensitive adhesive of claim 1 further containing a thermally expandable thermoplastic microsphere which contains a core material which expands upon heating.

19. The pressure-sensitive adhesive of claim 18 wherein said core material is an organic substance which has a lower boiling point than the softening temperature of said thermoplastic resin.

20. An article comprising roof molding with a layer of the pressure-sensitive adhesive of claim 18.

* * * * *